United States Patent
Hancock et al.

(10) Patent No.: US 7,311,282 B2
(45) Date of Patent: *Dec. 25, 2007

(54) HOUSING FOR INFORMATION STORAGE MEDIUM AND METHOD USING SAME

(75) Inventors: Reed A. Hancock, Tucson, AZ (US); James A. Jackmond, deceased, late of Tucson, AZ (US); by Linda S. Daanen, legal representative, Tucson, AZ (US); Joseph C. Ramirez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 10/895,176

(22) Filed: Jul. 20, 2004

(65) Prior Publication Data

US 2005/0103914 A1 May 19, 2005

Related U.S. Application Data

(63) Continuation-in-part of application No. 10/107,087, filed on Mar. 25, 2002, now Pat. No. 6,764,037.

(51) Int. Cl.
*G11B 23/107* (2006.01)

(52) U.S. Cl. .................... 242/348; 360/132

(58) Field of Classification Search ........... 242/348, 242/347.1; 360/83, 85, 93, 132, 133; 369/291
See application file for complete search history.

(56) References Cited

U.S. PATENT DOCUMENTS

| | | | |
|---|---|---|---|
| 3,857,531 A * | 12/1974 | Jantzen | 242/348 |
| 3,861,611 A | 1/1975 | Esashi et al. | |
| 4,320,430 A | 3/1982 | Vogt | |
| 4,412,260 A * | 10/1983 | Stricklin et al. | 360/132 |
| 4,459,628 A | 7/1984 | Barton | |
| 4,488,191 A | 12/1984 | Oishi et al. | |
| 4,646,192 A | 2/1987 | Droux et al. | |
| 4,864,452 A | 9/1989 | Thompson et al. | |
| 5,197,055 A | 3/1993 | Hartung et al. | |
| 5,479,581 A | 12/1995 | Kleinschnitz | |
| 5,868,338 A | 2/1999 | Martin et al. | |
| 5,914,919 A | 6/1999 | Fosler et al. | |
| 5,969,915 A | 10/1999 | Patterson | |
| 5,970,030 A | 10/1999 | Dimitri et al. | |
| 6,097,574 A | 8/2000 | Morita et al. | |
| 6,764,037 B2 * | 7/2004 | Hancock et al. | 242/348 |
| 7,104,488 B2 * | 9/2006 | Hiraguchi | 242/348 |

\* cited by examiner

*Primary Examiner*—William A. Rivera
(74) *Attorney, Agent, or Firm*—Chandler & Udall, LLP; Dale F. Regelman (57) ABSTRACT

A seven-sided housing for an information storage medium, where one of the seven sides is moveable in two planes to allow access to an information storage medium disposed therein. A portable data storage cartridge, which includes an information storage medium disposed in the housing. A method to read information from, and/or write information to, the information storage medium is disposed within the portable data storage cartridge. An information storage and retrieval system, which includes one or more of the portable data storage cartridges. A method to read information from, and/or write information to, an information storage medium disposed in the data storage cartridge. An information storage and retrieval system, which includes a computer useable medium having computer readable program code disposed therein for writing information to and/or retrieving information from, an information storage medium disposed within the portable data storage cartridge.

21 Claims, 10 Drawing Sheets

HOUSING FOR INFORMATION STORAGE MEDIUM AND METHOD USING SAME

CROSS-REFERENCE TO RELATED APPLICATIONS

This Application is a Continuation-In-Part of Ser. No. 10/107,087 filed Mar. 25, 2002, now U.S. Pat. No. 6,764,037.

FIELD OF THE INVENTION

This invention relates to the field of housings for moveable information storage media. In certain embodiments, the invention relates to a tape storage cartridge.

BACKGROUND OF THE INVENTION

Tape media, such a magnetic tape, is a common medium for the storage of data to be utilized by a computer. Magnetic tape has found widespread use as a data storage medium because it provides a relatively inexpensive solution for storing large amounts of data. Magnetic tape is typically stored on cartridges of which there are a variety of different types and sizes. One reason for the variety of cartridge types is the variety of different tape drives in which the cartridges are used.

Tape cartridges are comprised essentially of a cartridge shell which houses a rotatably mounted reel. Magnetic tape is wound around the hub of the reel. Reel flanges are used to contain the magnetic tape as the magnetic tape is wound on the hub. A fully loaded tape cartridge has magnetic tape wound around the hub such that the multiple layers of tape form a stack of magnetic tape extending out to near the end of the reel flanges. The tape cartridge is inserted into a tape drive mechanism which automatically threads the magnetic tape from the tape cartridge through the tape guide mechanism of the tape drive assembly. The tape is then available to the tape drive mechanism for the reading and writing of data.

Tape cartridges containing, for example, magnetic tape, are often used in automated data storage libraries. Such automated media storage libraries are known for providing cost effective access to large quantities of stored media. One (or more) accessor typically accesses the tape cartridges from a plurality of storage slots and delivers the accessed tape cartridge to a data storage drive for reading and/or writing data on the accessed tape cartridge. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical surface. To double the storage capacity, two "walls" of storage slots may be provided on either side of the accessor.

SUMMARY OF THE INVENTION

Applicants' invention includes a housing for an information storage medium. Applicants' housing includes a top, a bottom, and four sides, where the four sides in combination with the top and the bottom define an enclosure having an opening. Applicants' housing further includes a moveable, curved door slidingly disposed within the enclosure, where that moveable, curved door comprises a radius of curvature having a center point located outside the enclosure.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a portable data storage cartridge disposed in an information storage and retrieval system. The following description of Applicant's apparatus and method is not meant, however, to limit Applicant's invention to tape cartridges or to data processing applications, as the invention herein can be applied to information storage in general.

Figure 1A:
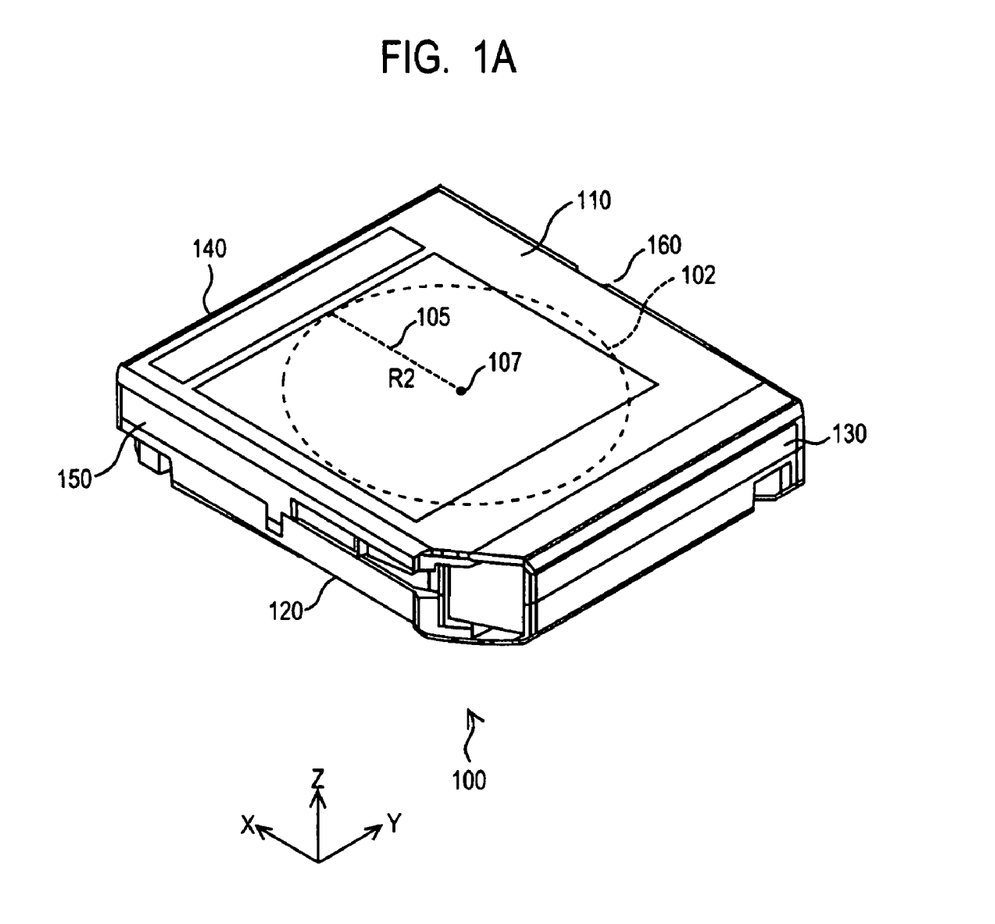
FIG. 1A shows a first perspective view of Applicants' housing.
Figure 1B:
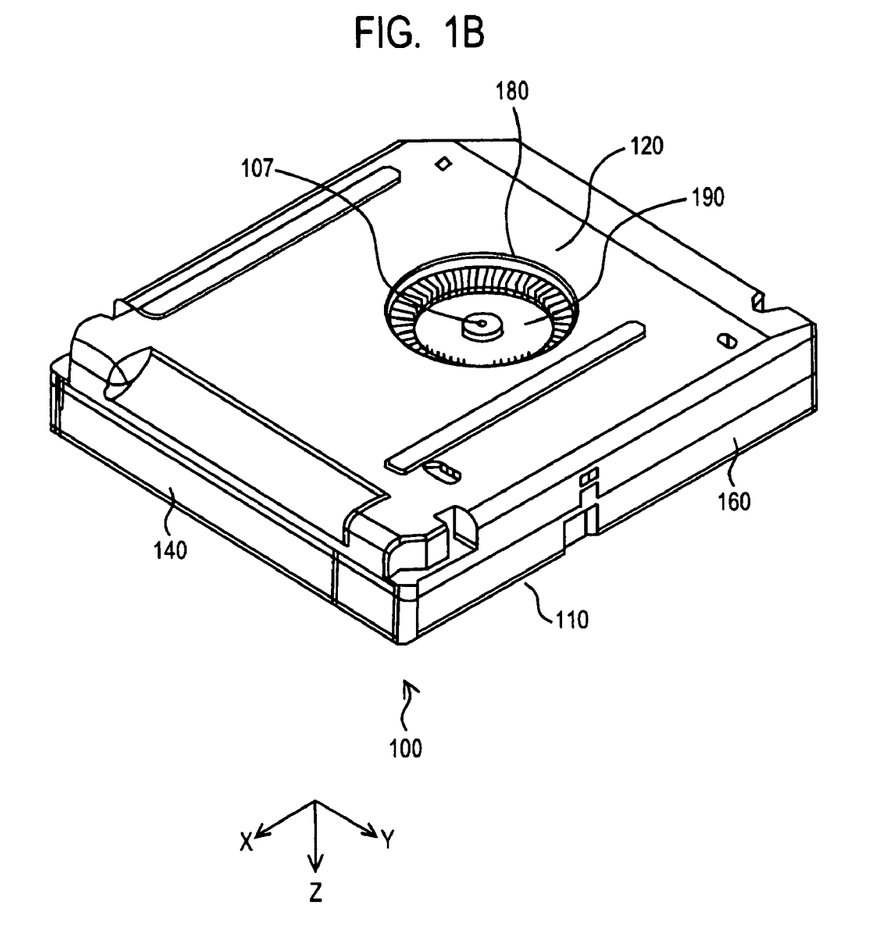
FIG. 1B shows a second perspective view of Applicants' housing.

FIGS. 1A and 1B show Applicants' housing 100. Rotatable reel 102 is moveably disposed within housing 100. Rotatable reel 102 has a radius of curvature 105, i.e. R2. Rotatable reel can be rotated in the X/Y plane around center point 107.

There are various features not shown on housing 100, such as locating notches, write-inhibiting switches, and the like. Housing 100 is only exemplary, and certain housing embodiments of present invention are applicable to any configuration of housing 100, and are useful for enclosing various information storage media.

Figure 2:
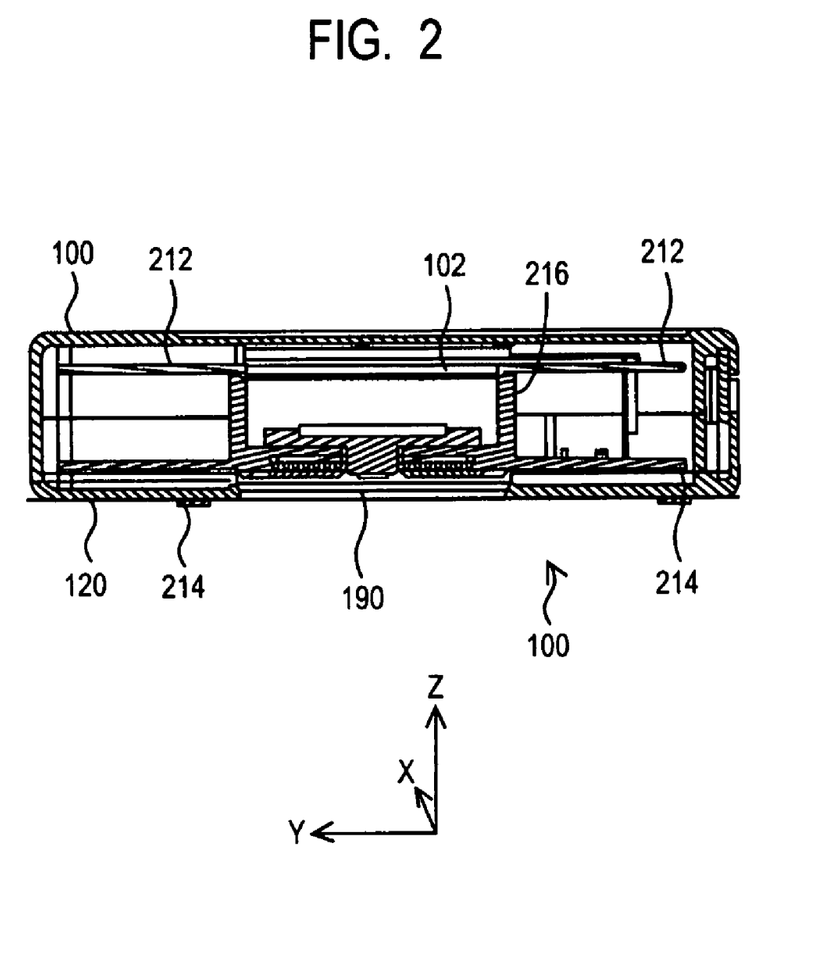
FIG. 2 shows a cross-sectional view of Applicants' housing.

Referring to FIG. 1B, bottom 120 includes aperture 180. Assembly 190 is disposed on the bottom portion of reel 102 adjacent aperture 180. FIG. 2 shows a cross-section view Applicants' housing. Tape reel 102 comprises first flange 212, second flange 214, and hub 216. Flanges 212 and 214 connect to, and extend radially outward from, hub 216 forming a channel between them in which a tape storage medium (not shown in FIG. 2) is contained as that tape is wound around hub 216.

As those skilled in the art will appreciate, when housing 100 is removeably disposed in, i.e. mounted in, a data storage device, a drive motor mechanism (not shown in FIG.

2) extends through aperture 180 to releaseably engage rotatable assembly 190. In response to signals from a tape drive controller, the drive motor mechanism rotates reel 102. The operation of the drive motor mechanism is coordinated with the remainder of the tape drive mechanism to draw the tape from Applicants' housing for use in the tape drive mechanism to, for example, read and/or write data thereon.

Figure 3:
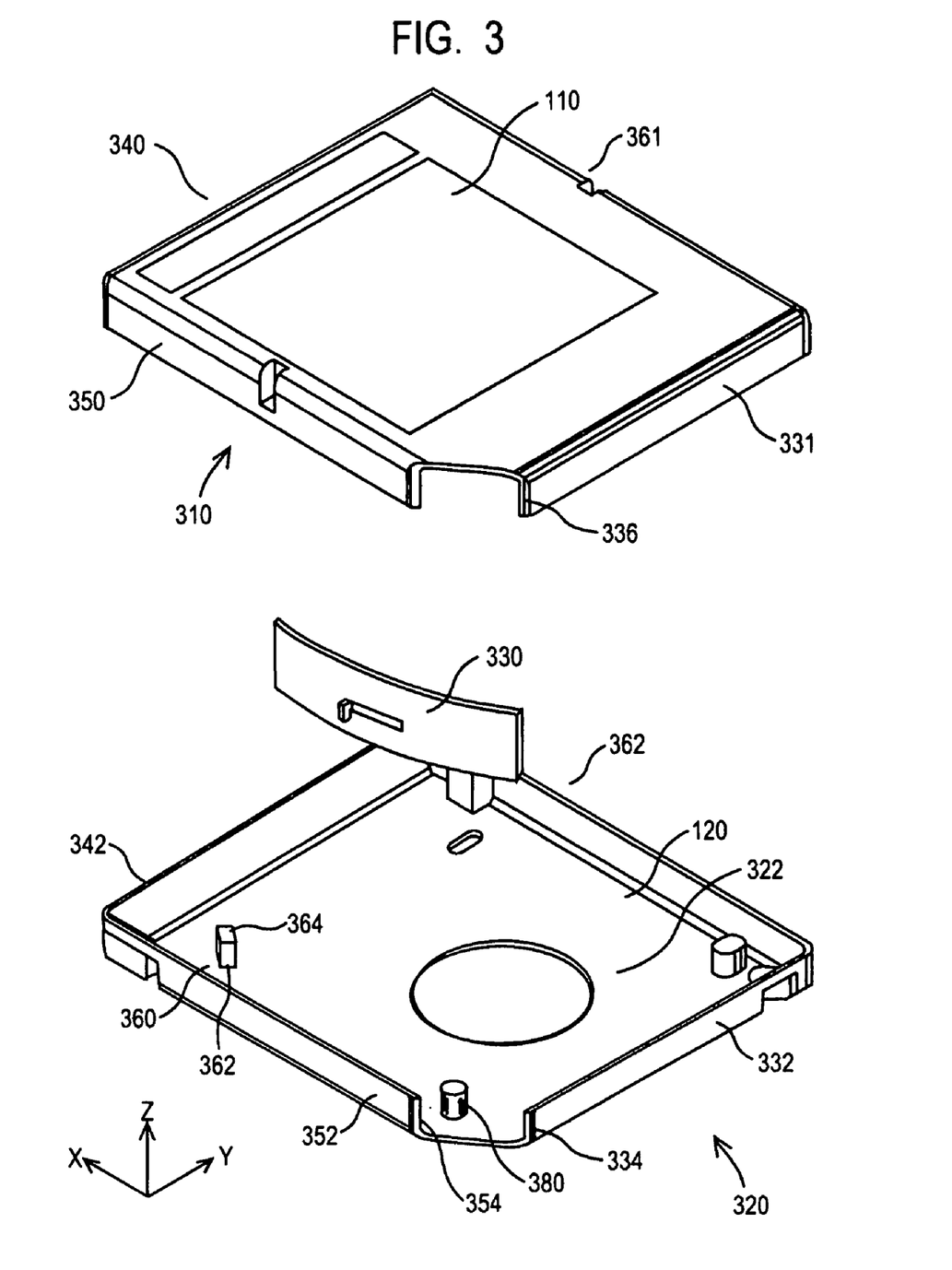
FIG. 3 shows a perspective view of the assemblies used to form Applicants' housing.

Referring to FIG. 3, in certain embodiments housing 100 comprises first assembly 310, second assembly 320, and moveable door assembly 330. First assembly 310 comprises top 110 (FIG. 1) and sides 331, 340, 350, and 361 which attach to side 110 and extend outwardly therefrom. First assembly 310 is formed from any rigid material, including plastic, metal, and combinations thereof. First assembly 310 can be molded as an integral body, or can be formed from sides 110, 330, 340, 350, and 361, which have been attached as shown in FIG. 3 using conventional techniques, including, for example, adhesive bonding, plastic welding, spot welding, welding, use of mechanical fasteners such as screws, nuts, bolts, and the like.

Second assembly 320 comprises bottom 120 (FIG. 1), and sides 332, 342, 352, and 362, which attach to side 120 and extend outwardly therefrom. Second assembly 320 is formed from any rigid material, including plastic, metal, and combinations thereof. Second assembly 320 can be molded as an integral body, or can be formed from sides 120, 332, 342, 352, and 362, which have been attached as shown in FIG. 3 using conventional techniques, including, for example, adhesive bonding, plastic welding, spot welding, welding, use of mechanical fasteners such as screws, nuts, bolts, and the like.

Assembly 320 includes interior surface 322. Member 380 is attached to surface 322, adjacent end 354 of side 352, and extends outwardly from surface 322. In certain embodiments, member 380 has a cylindrical shape, i.e. a circular cross-section. In certain embodiments, member 380 has a substantially square cross-section. By "substantially" square cross-section, Applicants' mean either a square cross-section, or a square cross-sectional shape which includes rounded corners. In certain embodiments, member 380 has a substantially rectangular cross-section. In certain embodiments, member 380 has an elliptical cross-section. In certain embodiments, member 380 has a substantially pentagonal cross-section. In certain embodiments, member 380 has a substantially hexagonal cross-section.

Member 360 is disposed on surface 322 and extends outwardly therefrom. In certain embodiments, member 360 has a cylindrical shape, i.e. a circular cross-section. In certain embodiments, member 360 has a substantially square cross-section. In certain embodiments, member 360 has a substantially rectangular cross-section. In certain embodiments, member 360 has an elliptical cross-section. In certain embodiments, member 360 has a substantially pentagonal cross-section. In certain embodiments, member 380 has a substantially hexagonal cross-section. First end 362 of member 360 is attached to surface 322, adjacent side 352. Second end, i.e. the distal end, 364 of member 360 extends outwardly from surface 322.

Figure 4:
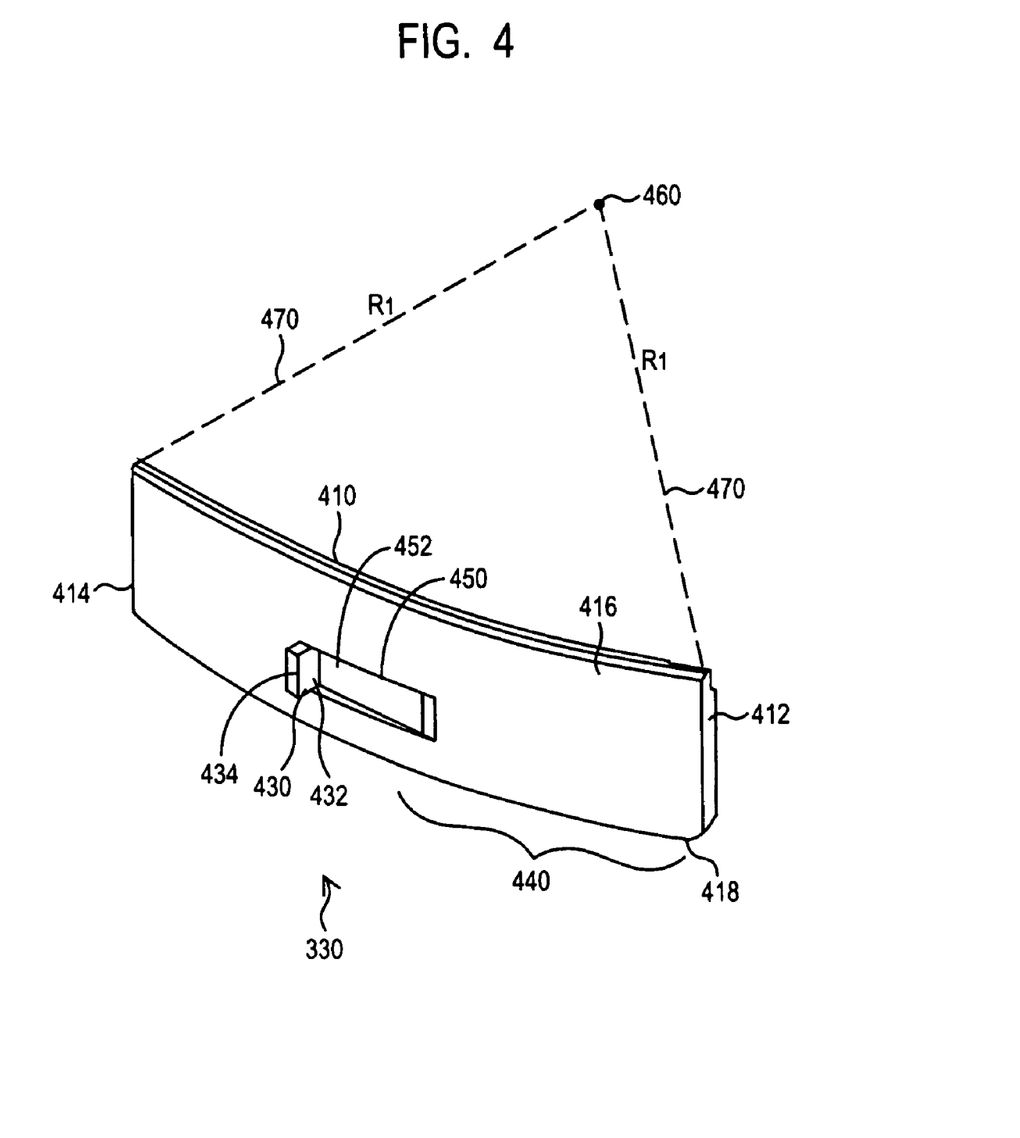
FIG. 4 shows a perspective view of a curved, moveable door assembly disposed within Applicants' housing.

Referring now to FIG. 4, moveable door assembly 330 comprises member 410 which includes first end 412, second end 414, and first surface 416. Member 410 has a "curved" shape that defines an arc comprising a portion of a circle having radius 470, i.e. radius of curvature $R_1$, and a centerpoint 460.

Figure 5:
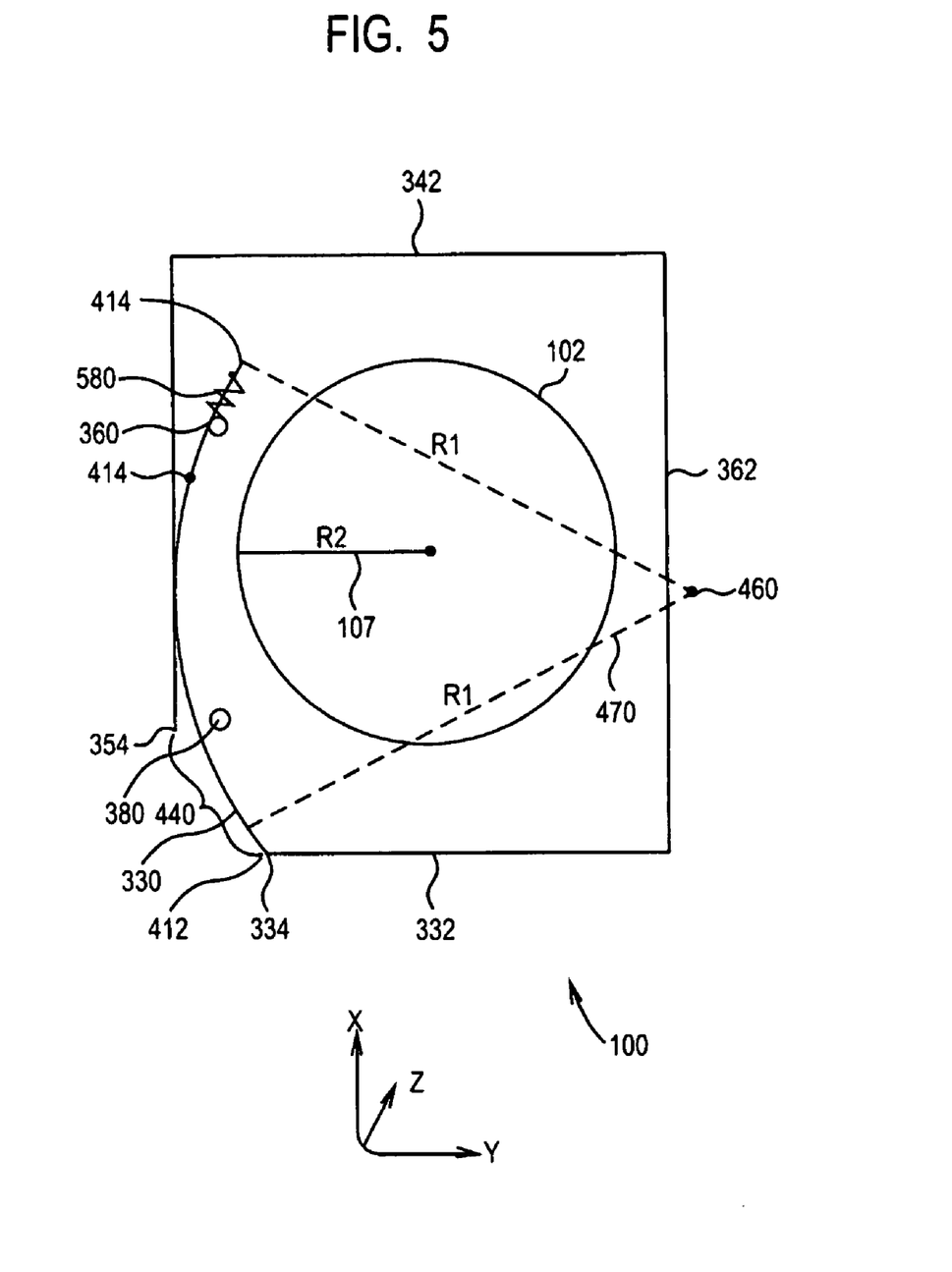
FIG. 5 is a top view showing Applicants' curved, moveable door assembly in relation to a reel rotatably disposed within Applicants' housing.
Figure 6:
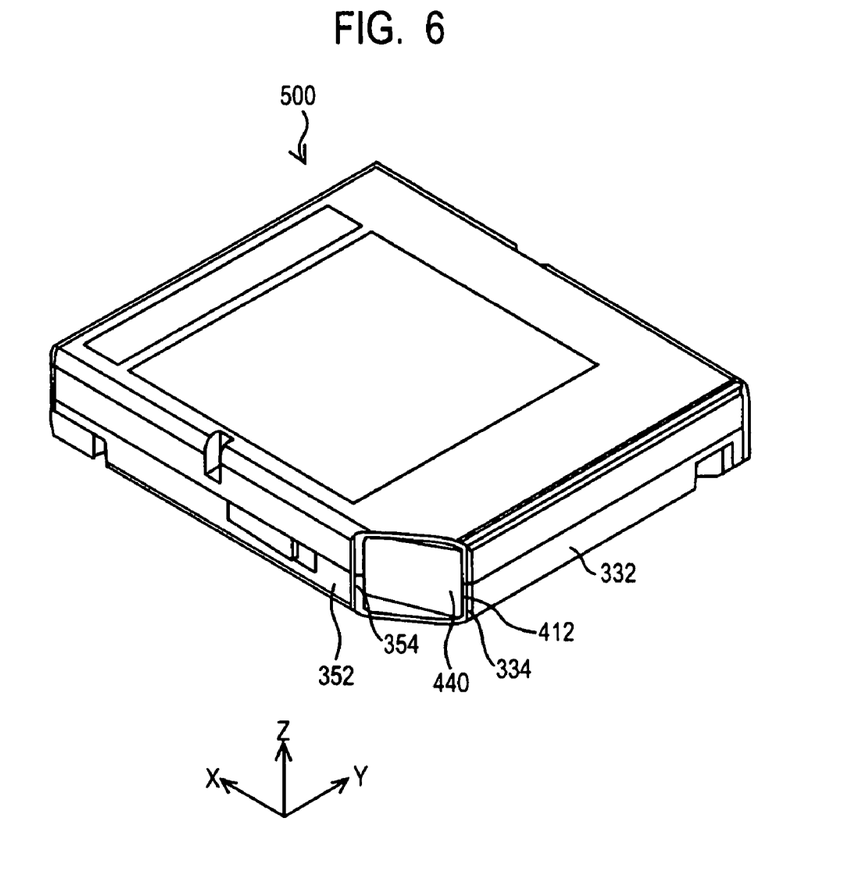
FIG. 6 shows a perspective view of Applicants' housing where the curved, moveable door is in a closed position.

Member 430 is disposed on member 410 and extends outwardly therefrom. Member 430 comprises first end 432 and second end 434. First end 432 is disposed on surface 416 with second end 434 extending outwardly from surface 416. In certain embodiments, surface 416 includes groove 450. In certain embodiments, first end 432 of member 430 is disposed on floor portion 452 of groove 450. FIGS. 5 and 6 show moveable door assembly 330 slidingly disposed in housing 100 in a first, i.e. closed, position, wherein end 412 (FIG. 4) of door portion 440 (FIG. 4) is disposed adjacent end 334 (FIG. 3) of side 332.

In certain embodiments, Applicants' housing includes spring 580. Spring 580 has a first end attached to door assembly 330 at point 414, and a second end attached to member 360. With assembly 330 disposed in the first position shown in FIG. 5, spring 580 comprises a first distance D1 between attachment point 414 and member 360. In this first position, spring 580 exerts a first force $F_1$ on assembly 330. In the absence of an opposing force, first force $F_1$ keeps assembly 330 in the first position shown in FIG. 5. In graph 700 (FIG. 7), position $X_1$ corresponds to the above-described first position wherein end 412 is disposed end 334 (FIGS. 3, 5, 6) by first force $F_1$.

When moveable assembly 330 (FIGS. 3, 4, 5) is moved to the second, i.e. open, position, spring 580 is disposed in a second orientation, i.e. stretched. In this second orientation, a second distance $D_2$ exists between attachment point 414 and member 360. Second distance $D_2$ is greater than first distance $D_1$. In this second orientation, spring 580 exerts a second force $F_2$ on assembly 330. Second force $F_2$ is greater than first force $F_1$. In graph 700 (FIG. 7), position $X_2$ corresponds to the above-described second position wherein end 412 is disposed adjacent end 354 (FIGS. 3, 5, 6).

Figure 7:
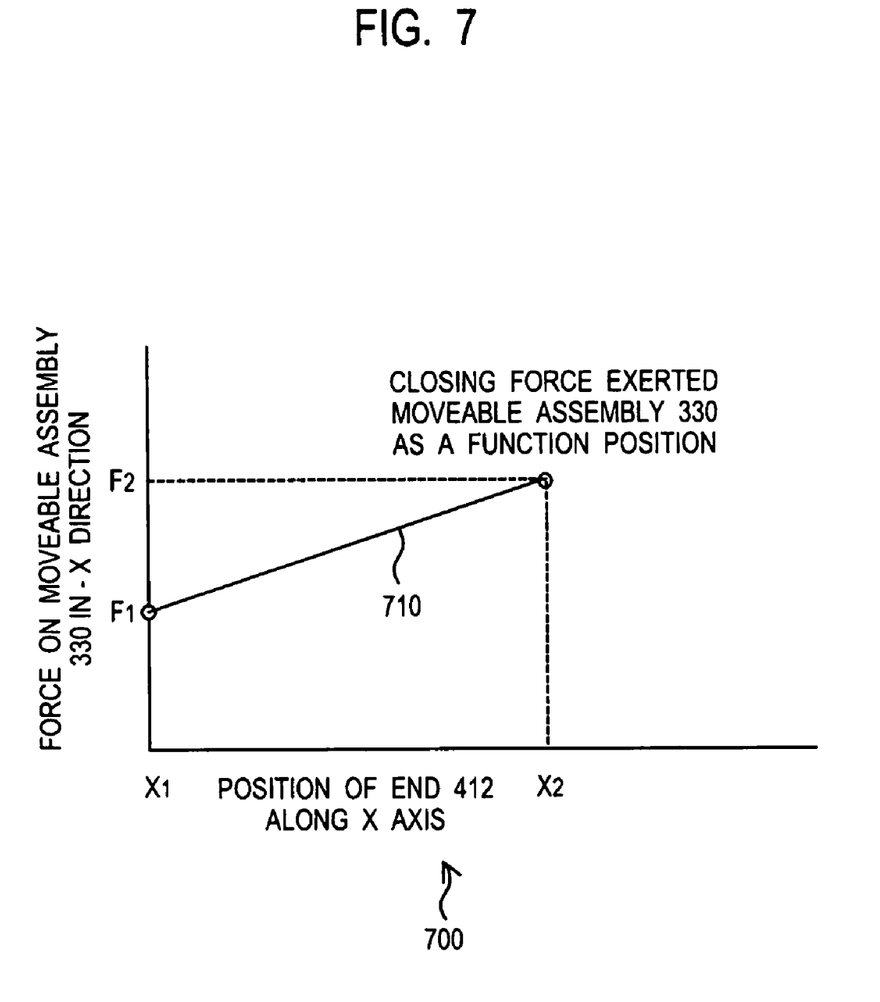
FIG. 7 graphically recites the force F2 required move Applicants' curved, moveable door to an open position

In the event a force equal to, or greater than, second force $F_2$ is exerted on moveable assembly 330 in the +X direction, then moveable assembly 330 slidingly moves from the first position, i.e. closed position, to the second position, i.e. open position. In graph 700 (FIG. 7), curve 710 represents the closing force exerted on moveable assembly 330 as a function of the position of end 412 in the X direction. In FIG. 7, this closing force has a linear relationship with respect to the position of end 412. In other embodiments of Applicants' invention, this closing force has a more complex, i.e. quadratic, cubic, and the like, relationship to the position of moveable assembly 330.

FIG. 5 further shows radius of curvature 470 (FIGS. 4, 5) of moveable door assembly 330 and centerpoint 460 (FIGS. 4, 6) for that radius of curvature 470. Radius 470 corresponds to radius of curvature R1. As R1 increases, more room within housing 100 becomes available for rotatable reel 102. As shown in FIG. 5, centerpoint 460 lies outside the dimensions of housing 100.

FIG. 5 further shows rotatable reel 102 (FIGS. 1, 2, 5) having a radius 107 (FIGS. 1, 5) and centerpoint 107 (FIGS. 1, 5). Centerpoint 107 lies within the dimensions of housing 100. Thus, moveable door assembly 330 and rotatable reel 102 are non-concentric. By "non-concentric," Applicants mean curved moveable door assembly 330 and rotatable reel 102 have differing radii of curvature and different centerpoints. Radius 107 corresponds to radius of curvature R2. In certain embodiments, R1/R2 is greater than 2. In certain embodiments, R1/R2 is greater than 3.

Figure 8:
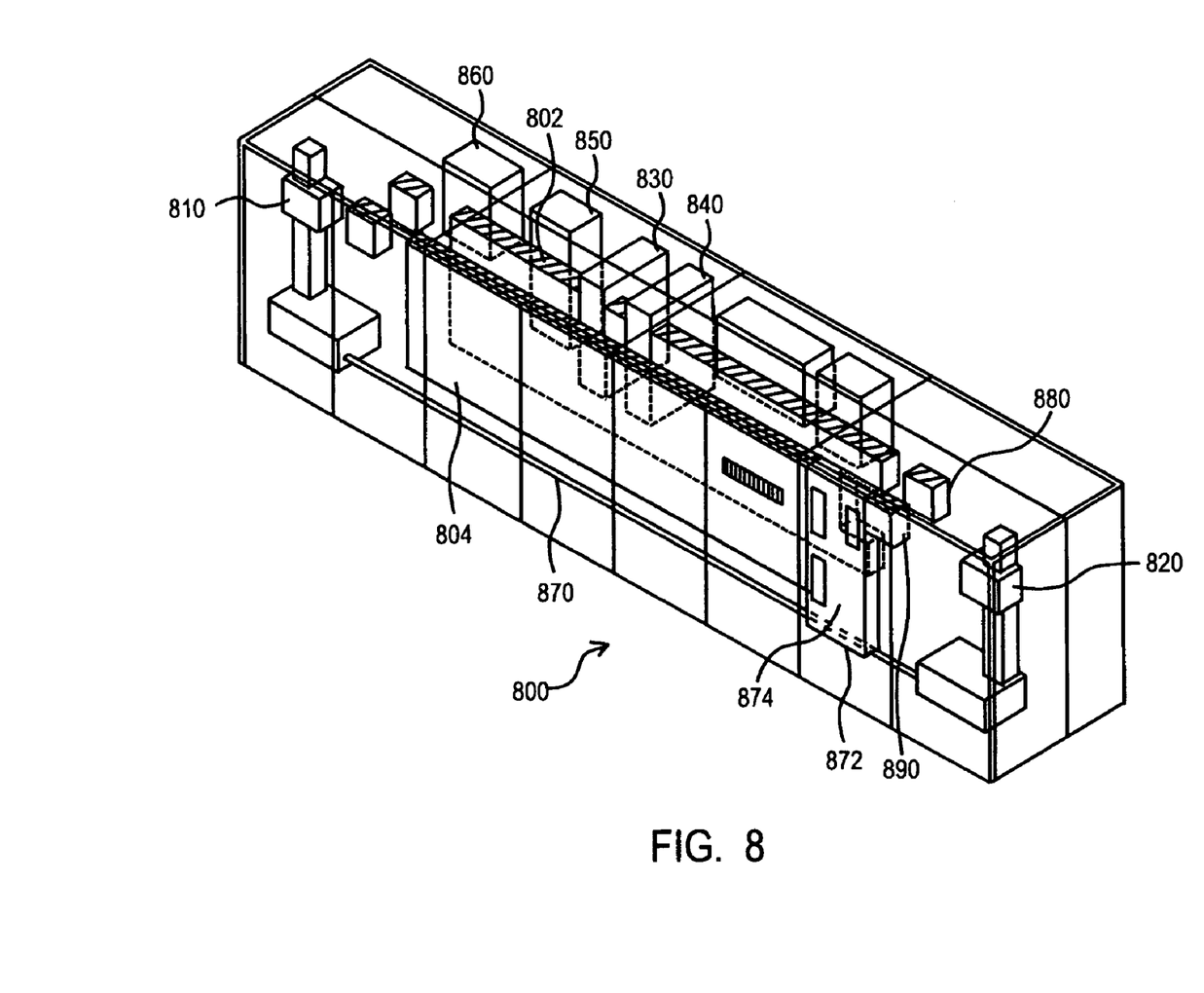
FIG. 8 shows a perspective view of Applicants' automated data storage library, and FIG. 9 summarizes the steps of Applicants' method to read information from, and/or write information to, an information storage medium disposed within Applicants' housing.

Referring now to FIG. 8, automated data storage and retrieval system 800 is shown having a first wall of storage slots 802 and a second wall of storage slots 804. One or more of Applicants' portable data storage cartridges are individually stored in one or more of these storage slots.

Applicant's automated data storage and retrieval system includes one or more accessors, such as accessors 810 and 820. An accessor is a robotic device which accesses portable data storage media from first storage wall 802 or second storage wall 804, transports that accessed media to data storage devices 830/840 for reading and/or writing data thereon, and returns the media to a proper storage slot. As shown in FIG. 8, accessors 810 and 820 travel bi-directionally along rail 870 in an aisle disposed between first wall of storage slots 802 and second wall of storage slots 804.

In certain embodiments, device 860 comprises a library controller. In certain of these embodiments, library controller 860 is integral with a computer. In other embodiments, Applicants' data storage and retrieval system utilizes a distributed control network. In these distributed control network embodiments, device 860 may comprise a motion card pack.

Referring again to FIG. 8, operator input station 850 permits a user to communicate with Applicant's automated data storage and retrieval system 800. Power component 880 and power component 890 each comprise one or more power supply units which supply power to the individual components disposed within Applicant's automated data storage and retrieval system. Import/export station 872 includes access door 874 pivotably attached to the side of system 800. Applicants' portable data storage cartridges can be placed in the system, or in the alternative, removed from the system, via station 872/access door 874.

Applicants' data storage and retrieval system and data storage devices 830 and 840 include hardware and/or software such that when Applicants' portable data storage cartridge comprising an information storage medium disposed in Applicants' housing 100 is disposed in devices 830/840, a force equal to, or greater than, second force $F_2$ is exerted on distal end 434 (FIG. 4) of member 430 (FIG. 4) in a first direction, i.e. in the +X direction shown in FIGS. 5 and 6, causing moveable door assembly 330 (FIGS. 3, 4, 5) to move from the first/closed position to the second/open position, thereby allowing access by the data storage device to the information storage medium disposed within the portable data storage cartridge.

Figure 9:
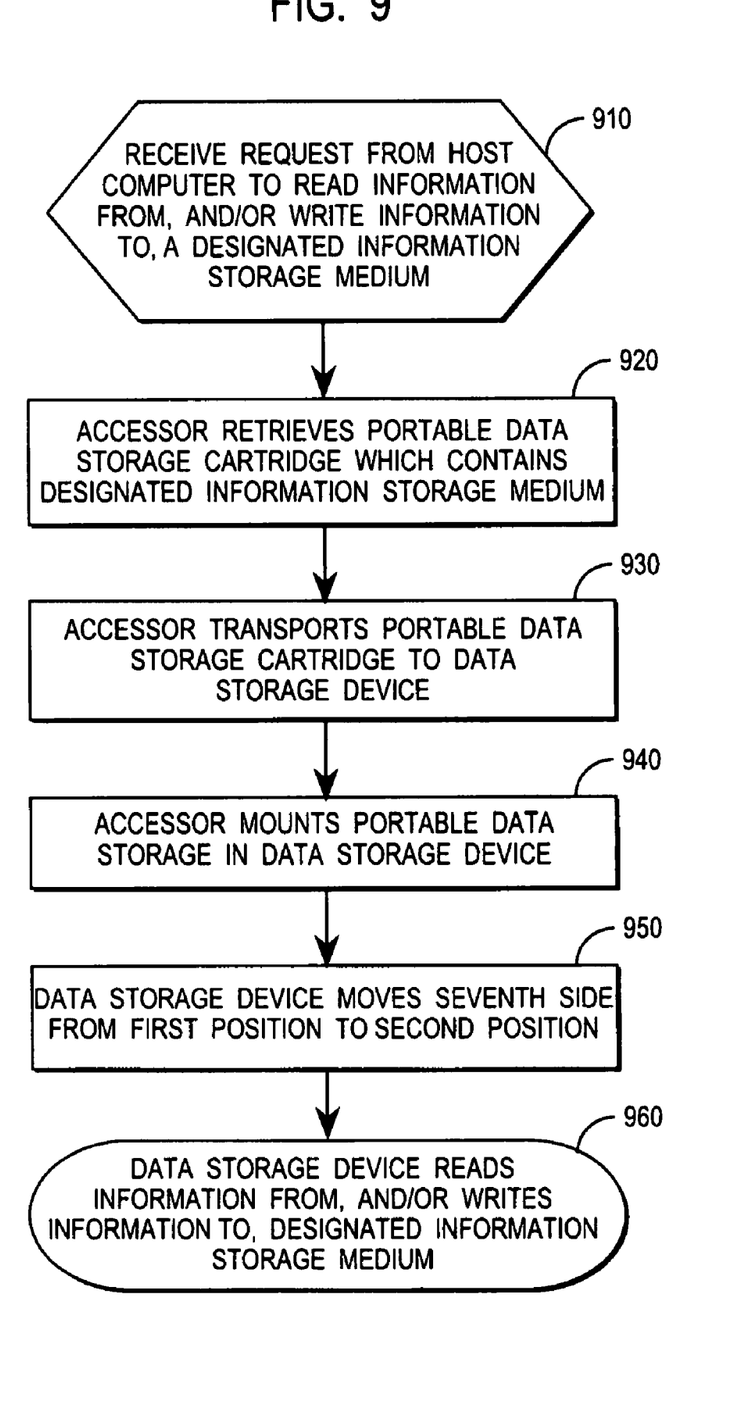

Applicants' invention includes a method to read information from, and/or write information to, an information storage medium disposed within a portable data storage cartridge comprising Applicants' housing, where that portable data storage cartridge is moveable disposed within Applicants' data storage and retrieval system, such as system 800. FIG. 9 summarizes the steps of Applicants' method.

In step 910, Applicants' data storage and retrieval system, such as system 800 (FIG. 8), receives a request from one or more host computers to read information from, and/or write information to, a designated information storage medium disposed within a portable data storage cartridge comprising Applicants' housing 100. In step 920, an accessor, such accessor 810 (FIG. 8)/820 (FIG. 8), retrieves the portable data storage cartridge from a storage slot, such as a storage slot disposed in first storage wall 802 (FIG. 8)/second storage wall 804 (FIG. 8).

In step 930, the accessor transports the portable data storage cartridge to a data storage device, such as device 830 (FIG. 8)/840 (FIG. 8). In step 940, the accessor disposes, i.e. mounts, the portable data storage cartridge in the data storage device. In step 950, the data storage device moves the curved, moveable door from the closed position to the open position. In step 960, the data storage device reads information from, and/or writes information to, the information storage medium disposed in Applicant's portable data storage cartridge.

Applicants' data storage and retrieval system includes a computer useable medium having computer readable program code disposed therein for writing information to and/or retrieving information from, an information storage medium disposed within Applicants' portable data storage cartridge.

While the preferred embodiments of the present invention have been illustrated in detail, it should be apparent that modifications and adaptations to those embodiments may occur to one skilled in the art without departing from the scope of the present invention as set forth in the following claims.

We claim:

1. A housing for an information storage medium, comprising:
   a top;
   a bottom;
   four sides, wherein said four sides in combination with said top and said bottom define an enclosure having an opening;
   a moveable curved door slidingly disposed within said enclosure, wherein said moveable curved door comprises a radius of curvature having a center point, wherein said center point lies outside said enclosure.

2. The housing of claim 1, wherein said moveable curved door can be slidingly moved from a first position to a second position.

3. The housing of claim 2, wherein said housing comprises a contiguous enclosure when said moveable curved door is in said first position.

4. The housing of claim 3, wherein said housing includes said opening when said moveable curved door is in said second position.

5. The housing of claim 4, said moveable door further comprising a member disposed thereon and extending outwardly therefrom, wherein said member extends through a first one of said four sides.

6. The housing of claim 5, wherein:
   said member is disposed through said first side at a first location when said moveable curved door is in said first position; and
   said member is disposed through said first side at a second location when said moveable curved door is in said second position.

7. The housing of claim 6, further comprising:
   a spring having a first end and a second end, wherein said first end is attached to said moveable curved door, and wherein said second end is attached to said enclosure.

8. The housing of claim 7, wherein said spring exerts a first force on said moveable curved door when said moveable curved door is disposed in said first position, and wherein said spring exerts a second force on said moveable curved door-when said moveable curved is disposed in said second position, wherein said second force is greater than said first force.

9. A housing for an information storage medium, comprising:
   a top,
   a bottom;
   four sides, wherein said four sides in combination with said top and said bottom define an enclosure having an opening;
   a moveable curved door slidingly disposed within said enclosure;
   a tape reel rotatably disposed within said enclosure;
   wherein said moveable curved door and said tape reel are non-concentric.

10. The housing of claim 9, wherein:
    said moveable curved door comprises a first radius of curvature R1;

said tape reel comprises a second radius of curvature R2; and wherein R1/R2 is greater than 2.

11. The housing of claim 9, wherein R1/R2 is greater than 3.

12. The housing of claim 9, wherein said moveable curved door can be slidingly moved from a first position to a second position.

13. The housing of claim 12, wherein said housing comprises a contiguous enclosure when said moveable curved door is in said first position.

14. The housing of claim 13, wherein said housing includes said opening when said moveable curved door is in said second position.

15. The housing of claim 14, said moveable door further comprising a member disposed thereon and extending outwardly therefrom, wherein said member extends through a first one of said four sides.

16. The housing of claim 15, wherein:
said member is disposed through said first side at a first location when said moveable curved door is in said first position; and
said member is disposed through said first side at a second location when said moveable curved door is in said second position.

17. The housing of claim 16, further comprising:
a spring having a first end and a second end, wherein said first end is attached to said moveable curved door, and wherein said second end is attached to said enclosure.

18. The housing of claim 17, wherein said spring exerts a first force on said moveable curved door when said moveable curved door is disposed in said first position, and wherein said spring exerts a second force on said moveable curved door-when said moveable curved is disposed in said second position, wherein said second force is greater than said first force.

19. A data storage and retrieval system, comprising:
one or more accessors moveably disposed therein;
one or more storage slots;
one or more portable data storage cartridges individually stored in said one or more storage slots;
wherein one or more of said one or more portable data storage cartridges comprise:
a top;
a bottom;
four sides, wherein said four sides in combination with said top and said bottom define an enclosure having an opening;
a moveable curved door slidingly disposed within said enclosure, wherein said moveable curved door comprises a first radius of curvature R1;
a tape reel rotatably disposed within said enclosure, wherein said tape reel comprises a second radius of curvature R2;
wherein R1/R2 is greater than 2.

20. The information storage and retrieval system of claim 18, wherein R1/R2 is greater than 3.

21. A method to write information to, or retrieve information from, an information storage medium disposed within a portable data storage cartridge moveably disposed in a data storage and retrieval system, wherein said data storage and retrieval system further includes a data storage device;
wherein said portable data storage cartridge comprises:
a top;
a bottom;
four sides, wherein said four sides in combination with said top and said bottom define an enclosure having an opening;
a moveable curved door slidingly disposed within said enclosure, wherein said moveable curved door comprises a first radius of curvature R1, and wherein said moveable curved door can be slidingly moved between a first closed position and a second open position;
a tape reel rotatably disposed within said enclosure, wherein said tape reel comprises a second radius of curvature R2, wherein R1/R2 is greater than 2;
said method comprising the steps of:
retrieving said portable data storage cartridge from one of said one or more storage slots;
transporting said portable data storage cartridge to said data storage device;
disposing said portable data storage cartridge in said data storage device;
moving said moveable curved door from said first position to said second position, and reading information from and/or writing information to, said information storage medium.

* * * * *